United States Patent [19]

Haraguchi

[11] Patent Number: 4,579,435

[45] Date of Patent: Apr. 1, 1986

[54] FILM TRANSPORTATION SYSTEM FOR MOTOR BUILT-IN CAMERA

[75] Inventor: Shosuke Haraguchi, Kanagawa, Japan

[73] Assignee: Canon Kabushiki Kaisha, Tokyo, Japan

[21] Appl. No.: 643,253

[22] Filed: Aug. 22, 1984

[30] Foreign Application Priority Data

Aug. 23, 1983 [JP] Japan .................................. 58-152475
Aug. 23, 1983 [JP] Japan .................................. 58-152476
Aug. 23, 1983 [JP] Japan .................................. 58-152477
Aug. 25, 1983 [JP] Japan .................................. 58-154025
Aug. 25, 1983 [JP] Japan .................................. 58-154026

[51] Int. Cl.$^4$ ................................................ G03B 1/24
[52] U.S. Cl. .................................. 354/173.1; 354/214
[58] Field of Search ............... 354/173.1, 173.11, 212, 354/213, 214, 217, 218

[56] References Cited

U.S. PATENT DOCUMENTS

| | | | |
|---|---|---|---|
| 4,219,764 | 8/1980 | Terada et al. ..................... | 354/173.1 |
| 4,342,509 | 8/1982 | Wakanayashi et al. ............. | 354/214 |
| 4,362,370 | 12/1982 | Iwata et al. ......................... | 354/213 |
| 4,380,381 | 4/1983 | Tezuka ................................ | 354/213 |
| 4,383,747 | 5/1983 | Tezuka ................................ | 354/213 |
| 4,400,074 | 8/1983 | Akiyama et al. .................... | 354/213 |
| 4,460,256 | 7/1984 | Araki et al. ......................... | 354/214 |
| 4,479,705 | 10/1984 | Tamamura et al. ............... | 354/173.1 |
| 4,482,226 | 11/1984 | Tamamura .......................... | 354/214 |

Primary Examiner—Russell E. Adams
Attorney, Agent, or Firm—Toren, McGeady, Stanger, Goldberg & Kiel

[57] ABSTRACT

In a camera where motorized rewinding is performed by a built-in electric motor, a film transportation system is provided which includes a rewind member arranged upon engagement with a cartridge hub to rewind a film roll, a first driving torque transmission mechanism having a frictional member upon contact with the rewind member to transmit the driving torque of the motor thereto, a drive member engaging the perforations of the film to move the film in the film rewinding direction, and a second driving torque transmission mechanism arranged upon connection with the first transmission mechanism to transmit the driving torque of the motor to the drive member and having a one-way clutch.

76 Claims, 10 Drawing Figures

FILM TRANSPORTATION SYSTEM FOR MOTOR BUILT-IN CAMERA

BACKGROUND OF THE INVENTION

1. Field of the Invention:

This invention relates to cameras having electric motors for film transportation.

2. Description of the Prior Art:

Currently, the rewinding of the film in a camera has been performed by engaging a rewind member on the camera housing with the spool of the film cartridge. Because the size of the cartridge varies from film type to type, however, a so-called "jiggling" takes place during the rewinding operation. It has, therefore, been difficult to transmit the driving torque to the spool with good efficiency. Even if the casing of the cartridge is held stationary in the chamber therefor, because the spool itself is very loosely mounted in the cartridge casing, a similar problem will arise. Further, to facilitate a smooth coupling of the rewind member into the recess of the spool of the cartridge, the rewind member must be formed to enable a large play in the spool recess. With the addition of this condition, the difficulty of achieving a driving torque transmission with good efficiency is intensified. Thus, the power necessary to perform all rewinding has been very large.

Such waste of energy, though negligible in the case of manual rewinding, leads, in the case of motorized rewinding, to a premature consumption of the battery, and another difficult problem of assuring the maximum torque to the film rewinding under the worst conditions.

In the art of motor built-in single lens reflex cameras, the film transportation and the charging of the internal mechanisms have generally been carried out by only one electric motor. It is to be noted here that when in the winding mode, the film is driven to move by a sprocket for the purpose of accurately adjusting the shift of the film to one frame. The use of one motor, however, gives rise to the following problems:

(i) The two requirements of assuring a sufficient film transporting power and of insuring that damage of the perforations of the film are avoided are difficult to fulfill simultaneously.

(ii) Because, during winding, friction is used in driving the take-up spool, the energy loss due to slippage is large.

(iii) Because the supply and take-up spools are located at either end of the lateral length of the camera, the use of only one motor makes it difficult to achieve a good efficiency of power transmission in both directions to the supply and take-up spools.

For the leaf shutter types of cameras of which the load on charging is small, the above-described problems have been overcome by various proposals. But, it is difficult to apply such a proposal without any alteration to lens-interchangeable single lens reflex cameras of which the load on charging of the lens and shutter is very large.

So, in the single lens reflex camera, besides the motor for film transportation, an additional motor may be considered to be used exclusively for charging the shutter and the lens as is known in the proposal of U.S. Pat. No. 4,204,759. In this proposal, however, the latter motor is put in a space near the bottom of the mirror box. But, this space is usually occupied by the focus detecting mechanism when the automatic focusing function is imparted to the camera.

To avoid this problem, the second motor may be positioned adjacent to the cartridge chamber to be used not only for rewinding but also for driving the autofocus (hereinafter abbreviated as "AF") mechanism as is known in the proposal of U.S. Pat. No. 4,405,221. In this proposal, however, the selective transmission of the driving torque of the motor to the AF driving system and the rewinding system must be controlled manually, giving rise to a problem when it is desired to achieve an improvement in automation of the camera.

Concerning the auto loading of film, the prior known method utilizes friction in rotating the spool to take up the film. Recently, to avoid the energy loss due to the friction, another method of directly driving the spool has found increasing use in the cameras. The cameras employing the latter method involve an inconvenience in that the photographer must take sure the film leader is pulled out to, and then accepted by, the take-up spool, or otherwise the automatic film loading mechanism would not work. So, an attempt has been made to provide for the sprocket with a one-way clutch arranged to allow the sprocket to move the film until the film engages with the spool, and after that, the spool to wind up the film. Since, at the early stage of the loading operation, however, this method brings only one side of the width of the film into engagement with the sprocket at the perforations thereof, there exists some possibility of damaging the perforations before the film leader reaches the take-up spool. If so, the automatic loading will fail.

To eliminate such problem, another sprocket may be additionally used as arranged near the cartridge chamber to engage the perforations of the upper and lower edges of the film at a time. With the use of one motor in driving the two sprockets, however, when such method is applied to the single lens reflex camera, as the upper and lower spaces on either side of the exposure aperture between the two sprockets are occupied by the penta prism and the mirror box with the focus detecting device respectively, the following problem is produced: That is, because of the necessity of creating a space which the required driving torque transmission occupies either above the penta prism, or below the focus detecting device, a large increase in the size of the camera is called for. Also, as the length of the path of transmission increases, the efficiency of driving torque transmission rapidly lowers, leading to a waste of electrical energy.

A motor for driving of the automatic focusing lens and an electrical power source therefor have been put within the lens mounting unit. Such arrangement was, however, objectionably incompatible with the compact design of objectives having the automatic focusing function. With respect to the electrical power source, the problem can be solved when an electrical interconnection is used to permit the common use of the battery within the camera housing. To remove the motor for driving the automatic focusing lens also it may be considered to commonly use the otherwise driving purpose motor. But, for the automatic focusing lens too, there is need to provide two way, or forward-reversed, driving. In order to properly perform these aspects of driving, a simple planetary gear could not suffice for the direction changeover mechanism.

Recently, as the automation of cameras is advancing, an automatic rewinding system also has been developed that when the film has all been exposed as detected by some means, the film starts to be rewound automatically. In the camera of this kind, as only one motor is used, the revolution of the planetary gear is utilized to convert the direction of rotation of the motor, thereby it being made possible to selectively operate the winding and rewinding modes.

To assure a precise interval between successive picture frames, however, a winding stop member for controlling the advancement of the film in each cycle of film winding operation becomes necessary. When in the rewinding mode, this winding stop member must be released. For this purpose, an electromagnet may be used. But because it consumes electrical energy during rewinding, this method is not preferred.

SUMMARY OF THE INVENTION

A first object of the present invention is to remove the adverse influence due to the low efficiency of transmission between the rewind member on the camera and the spool of the cartridge, and to provide a motor built-in camera having a film rewind device of better efficiency.

A second object of the present invention is to provide a motor built-in camera having motorized winding and rewinding capabilities of improved efficiency while permitting an advantageous arrangement of a film winding motor and a film rewinding motor and a great advance in automation of the camera to be achieved.

A third object of the present invention is to provide a motor built-in camera having an automatic loading mechanism of compact form with a low energy consumption.

A fourth object of the present invention is to provide a motor built-in camera with an automatic focusing lens of which the driving is made possible by a common motor of the mechanisms within the camera housing with an advantage of simplifying the structure of construction.

A fifth object of the present invention is to provide a motor built-in camera with automatic means for releasing the winding stop member, thereby it being made possible to rewind the film automatically.

A sixth object of the present invention is to provide a motor built-in camera capable of detecting when the blank transportation of the film is completed no matter how long the film leader may be.

Other objects of the present invention will become apparent from the following detailed description thereof.

BRIEF DESCRIPTION OF THE DRAWINGS

Various embodiments of the present invention will next be described by reference to the accompanying drawings in which.

DESCRIPTION OF THE PREFERRED EMBODIMENTS

The present invention will next be described in connection with various embodiments thereof based on the drawings.

Figure 1:
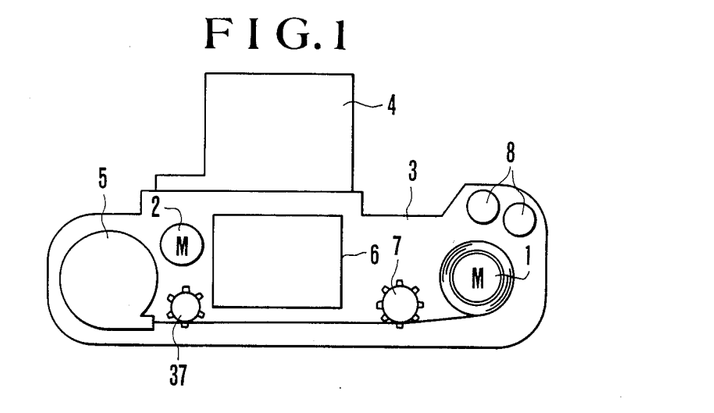
FIG. 1 is a schematic top plan view illustrating a motor arrangement of an embodiment of the camera according to the present invention.

FIG. 1 illustrates an arrangement of two motors 1 and 2 within a camera body 3 with an automatic focusing lens (hereinafter called "AF" lens). Also illustrated are a cartridge 5, a mirror box 6, a film detector member 7, batteries 8 and a sprocket 37. Since the first motor 1 is arranged within the take-up spool, it lies nearest to the spool to drive, and a minimum speed reduction mechanism is possible to transmit the driving torque of the motor 1 to the spool, thereby giving an advantage that the film can be wound up at a high efficiency.

The second motor 2 is arranged in a space between the cartridge chamber and the mirror box 6 at a position near the lens mount, and is oriented so that the axis of rotation of the motor is perpendicular to the paper. The motor 2 functions to drive the sprocket 37, to charge the shutter to move the AF lens, and to rewind the film. Since the motor 2 also is arranged near all of these members which it is to drive, the speed reduction mechanism therefor can be constructed, with a minimum size, with the advantage of transmitting the driving torque at a high efficiency. Also since the motor 2 is positioned on the side of the mirror box opposite to the grip portion, it does not interfere with the grip portion. Therefore, it is made possible to put the batteries 8 into the inside of the grip portion. It will be appreciated that the winding drive system and the rewinding drive system are perfectly separated from each other to achieve an improvement of the drive efficency.

Figure 2A:
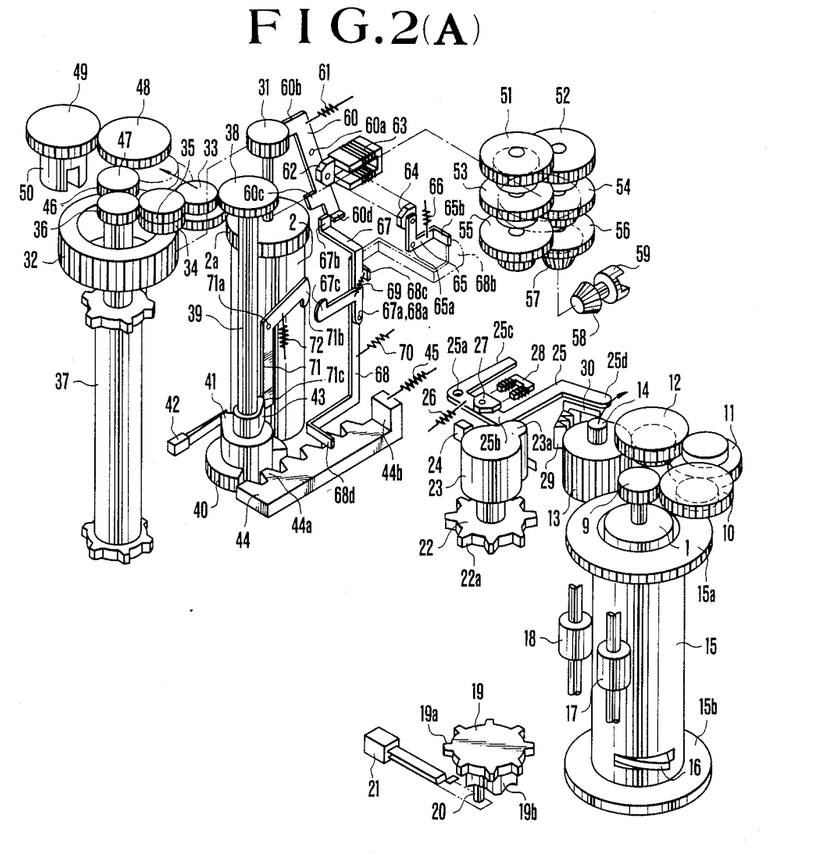
FIG. 2(A) is an exploded perspective view of winding and rewinding drive system according to the embodiment of the invention.

FIG. 2(A) illustrates the construction and arrangement of the members of each of the winding and rewinding drive systems of the invention and is assumed to be in a position where one cycle of film winding operation is finished. Looking first at the motor 1 dependent drive system, a pinion 9 is connected to the output shaft of the motor 1 and meshes with a gear 10 constituting a speed reduction together with another gear 11 through which the driving torque of the motor 1 is transmitted to a sun gear 12. A planetary gear 13 changes its directions of revolution and rotation depending on the direction of rotation of the sun gear 12. That is, as the sun gear 12 rotates in a counterclockwise direction, the planetary gear 13 revolves also in the counterclockwise direction, causing counterclockwise movement of a take-up spool 15 in meshing engagement with a toothed portion of a film guide flange 15a thereof (when in the winding mode). Upon engagement with one of the perforations of the film leader, a pawl 16 convolutes the film leader on the spool 15. Because the pawl 16 is urged to project outward by a spring (not shown), it is retractable till the outer periphery of the spool. A film pressor roller 17 on the back cover and another film pressor roller 18 on the framework of the camera body assist in automatically loading the film on the spool 15.

A film detecting member 19 has eight radial projections 19a and rotates as the film moves with its perforations engaging the projections 19a. This rotation is translated to vertically reciprocating movement of an actuator pin 20 for a film motion detecting switch 21 so that the switch 21 turns on and off repeatedly. The output of the switch 21 is connected to an input of a display (not shown). Another film detecting member 22 has also eight radial projections 22a and rotates as the film moves with its upper perforations engaging the projections 22a. A film advance control member 23 rotates as a unit with the second film detecting member 22 and has a cam lobe 23a. When the film has advanced one frame, the cam lobe 23a closes a switch 24 and acts on a winding stop lever 25, thereby the winding of the film is stopped. A sprind 26 urges the winding stop lever 25 to turn about a pivot pin 25a in a clockwise direction. When a coil of an electromagnet 28 of the attraction type is supplied with electrical power, an armature 27 is attracted, turning the lever 25 against the spring 26 in the counterclockwise direction, until a stopper portion 23a disengages from the cam lobe 23a of the film advance control member 23. Thus the film detecting member 22 becomes rotatable and is ready for the next cycle of winding operation. At the same time, a mirror release portion 25c of the winding stop lever 25 acts on a mirror latch (not shown), thereby the mirror is allowed to move downward.

When in the film rewinding mode, the winding stop lever 25 operates as follows: Prior to rewinding, the motor 1 rotates in the clockwise direction for a prescribed time. Thereby the planetary gear 13 is caused to revolve round the sun gear 12 in the clockwise direction to come to mesh with an internal gear 29, obtaining a strong revolving force. A boss 14 on the planetary gear 13 overruns a spring 30 and pushes a cam portion 25d of the winding stop lever 25, thereby the winding stop lever 25 is turned in the counterclockwise direction. After that, even when the rotation of the motor 1 stops, because the bias force of the spring 26 is not large enough to bring the boss 14 over the spring 30, the winding stop lever 25 does not rotate in the clockwise direction, and the stopper portion 25b does not engage the cam portion 23a, so that the film detecting member 22 becomes rotatable. Thus, the rewinding mode is ready to operate.

Another drive system which operates with the second motor 2 is described below. The motor 2 is constructed with a shaft and a tubular casing both of which are rotatable relative to each other. Here the term "relative rotation" means that the shaft and the casing rotate in the opposite directions to each other. Therefore, the stoppage of rotation of the shaft results in rotation of the casing in a prescribed direction, while the stoppage of rotation of the casing results in rotation of the shaft in the opposite direction to the above. To selectively rotate the shaft and the casing, there is provided a stop lever 60. When the stop lever turns about a pivot pin 60a in a counterclockwise direction, a pawl 60b engages a pinion 31 on the top of the motor shaft, thereby the tubular casing only is allowed to rotate. On the other hand, when it turns in the clockwise direction, a second pawl 60c engages a gear 2a on the casing, thereby the shaft only is allowed to rotate. An operating mechanism for the stop lever 60 will be described later.

Rotation of the pinion 31 is transmitted through a speed reduction gear train (not shown) to rotate a sun gear 32 in a clockwise direction when in winding mode, or in a counterclockwise direction when in the rewinding mode. When in the winding mode, a planetary gear 33 revolves in a clockwise direction as the sun gear 32 rotates, coming to engage with gears 34 and 38. Rotation of the gear 34 is transmitted through a one-way clutch mechanism of known construction shown in FIG. 2(B) to be described later, to a gear 35 and therefrom further through a gear 36 to rotate a sprocket 37 in the counterclockwise direction, thus advancing the film. In the meantime, the rotation of the gear 38 is transmitted through a shaft 39 to turn a cutout gear 40 and two cams 41 and 43 provided as a unit therewith in a clockwise direction. At a time during this rotation, the cutput gear 40 comes to mesh with a racked portion 44a of a charge member 44 and then moves the charge member 44 against a spring 45, thereby a shutter (not shown) is charged in engagement with an upward extension 44b. When the charging of the shutter has been completed, the geared portion of the cutout gear 40 moves away from the racked portion 44a, permitting the charge member 44 to return to the initial position by the action of the spring 45. A switch 42 is positioned adjacent the cam 41 to turn on when the shutter is fully cocked by the charge member 44.

Figure 2B:
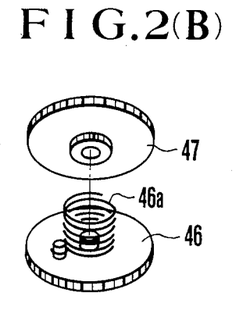
FIGS. 2(B) and 2(C) are enlarged exploded views of parts of the system shown in FIG. 2(A).
Figure 2C:
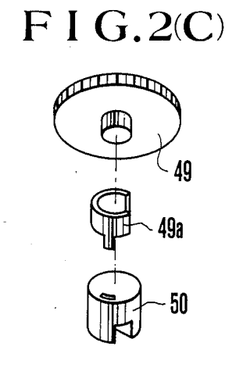

When switched to the rewinding mode, as the sun gear 32 rotates in the counterclockwise direction and, therefore, the planetary gear 33 also revolves in the counterclockwise direction, the planetary gear 33 comes to mesh with gears 46 and 48. The rotation of the gear 46 is transmitted through a one-way clutch (in the form of an usual coil spring 46a arranged as shown in FIG. 2(B) to constrain in only one direction so that a drive connection is established) to a gear 47 and therefrom further through the gear 36 to turn the sprocket 37 in the clockwise direction, thus moving the film backward. In the meantime, the rotation of the gear 48 is transmitted to a gear 49 and therefrom further through a friction mechanism in the form shown in FIG. 2(C) of an usual ring-shaped slip spring 49a to turn a fork 50 in the clockwise direction. Thus the film is taken up on the supply spool. It should be pointed but here that the friction between the gear 49 and the fork 50 which depends on the force of the aforesaid ring-shaped slip spring is designed to be as weak as possible provided for assurance that no slack loop is formed on the convoluted film on the supply spool in the cartridge. It should be also pointed out that the speed of rotation of the sprocket 37 in the rewinding mode is made slower than that of rotation of the gear 49. Hence, when a relatively weak power suffices for rewinding the film, the friction mechanism transmits rotation of the gear 49 to the fork 50 therethrough without slippage at most. Therefore, the fork 50 pulls the film at a faster speed than the gear 47 with the sprocket 37, and the rewinding operation depends only on the driving power of the fork 50. In this case, the one-way clutch mechanism between the gears 46 and 47 is rendered inoperative. As the load on the fork 50 is increasing, on the other hand, when the speed of rotation of the fork 50 falls below that of rotation of the sprocket 37, the latter begins to play a main role in driving the film to move. At this time, the driving torque of the fork 50 serves to remove any slack loop in the film.

It will be appreciated that in the embodiment of the present invention, as the force necessary to perform the rewinding operation varies with variation of the diameter of the convoluted film, when it is weak, the film is rewound directly by the spool, and when it becomes stronger, the sprocket partakes in rewinding film with an advantage that the rewinding operation can be carried out with high reliability. Another advantage is that because no excessive driving power is given to the operating mechanism, the consumption of electrical energy can be minimized.

The operating mechanism for the stop lever 60 is now described more fully with regard to the construction and arrangement of its members and its advantages. The stop lever 60 has extensions 60b and 60c and a bent-off portion 60d, is rotatable about a pivot axis 60a and is urged by a spring 61 in a clockwise direction. A release type electromagnet 63 is positioned adjacent an armature 62 on the stop lever 60 so that when the solenoid is un-energized, a permanent magnet (not shown) operates with its magnetic force to attract the armature 62 on the stop lever 60, and when energized, the armature 62 moves away therefrom. It should be noted that the bias force of the spring 61 is previously adjusted to such a value that so long as there is an air gap between the magnet 63 and the armature 62, the energization of the solenoid does not result in attraction of the armature 62. A latch lever 65 has an engaging portion 65b, is rotable about a pivot pin 65a, and is urged by a spring 66 in a counterclockwise direction. The bias force of the spring 66 is prevously adjusted to such a value that even when an air gap is present between an electromagnet 63 and an armature 64 on the latch lever 65 energization of the solenoid results in attraction of the armature 64. A lever 68 has an extension 68b for engagement with the engaging portion 65b of the latch lever 65, another extension 68d for engagement with the engaging portion 44b of the charge member 44, and an abutment 68c, and is urged to turn about a pivot pin 68a in a counterclockwise direction. Another lever 67 has an extension 67b for engagement with the engaging portion 60d of the stop lever 60, and a pawl 67c for engagement with a pawl 71b of a latch lever 71 to be described later, and is rotatable about a pin 67a (which is common with the pin 68a). A spring 69 is tensioned between the center of the lever 67 and the abutment 68c and urges the lever 67 to rest on the abutment 68c. The aforesaid second latch lever 71 has the pawled portion 71b for engagement with the pawled portion 67c of the lever 67, and is urged to turn about a pivot pin 71a in a clockwise direction.

The operation of the control mechansim for the stop lever 60 is as follows: The position of FIG. 2(A) is assumed when each cycle of film winding operation is completed. In this position, the pinion 31 on the shaft of the second motor 2 is hindered from rotation by the extension 60b of the stop lever 60, and the geared portion 2a is allowed to rotate. Rotation of the geared portion 2a is reduced in speed by gears 51 to 56 and then converted in direction at right angles by bevel gears 57 and 58, thus being transmitted to a coupler 59. The coupler 59 is in engagement with another coupler (not shown) in a lens mounting (not shown) which constitutes part of an automatic focusing mechanism (not shown). After the lens has been set in focus, the photographer will push down a shutter button, whereby the shutter is released. Then when the trailing curtain of the shutter has run down, the magnet 63 is energized to cancel the magnetic field of the permanent magnet.

Then, the latch lever is turned in the counterclockwise direction by the spring 66, to disengage the engaging portions 65b and 68b from each other. Therefore, the lever 67 is turned about the pin 67a by the spring 70 in the counterclockwise direction, and the lever 68 also is turned about the pin 68a in the counterclockwise direction by the engaging portion 68c. The engaging portion 67b of the lever 67 is also disengaged from the engaging portion 60d of the stop lever 60, whereby the stop lever 60 is turned in the clockwise direction by the spring 61. Thus the pawled portion 60c engages the geared portion 2a of the tubular casing of the motor 2 and holds this stationary. Meanwhile, after the elapse of a predetermined time from the closure of the shutter, the pinion 31 starts to rotate. Then the cam 43 rotates in the clockwise direction, 1 moving away from the tail 71c of the latch lever 71, whereby the latch lever is turned in the clockwise direction by the spring 72 to bring its pawl 71b into engagement with the pawl 67c of the counterclockwise turned latch lever 67. What role the engagement of the pawls 71b and 67c plays in the second half of the cycle of the winding operation is explained below. Even when in the second half of the cycle of winding operation, the pawl 60c of the stop lever 60 is in engagement with the geared portion 2a of the tubular casing. Because the coil of the magnet 63 is not supplied with electrical power, the latch lever 65 is attracted to the clockwise direction against the spring 66 by the magnet 63. Because the engaging portion 65b is out of connection with the engaging portion 68b, the lever 68 is turned in the counterclockwise direction by the spring 70.

During winding, the cutout gear 40 engages the racked portion 44a and the charge member 44 moves. Then, the lever 68 is turned in the clockwise direction through the connection of the engaging portion 68d with the engaging portion 44b of the charge member 44, whereby the engaging portion 68b is engaged with the engaging portion 65b of the latch lever 65. In this state, if the engagement of the cutout gear 40 and the racked portion 44a is broken before the completion of the winding operation, the charge member 44 is returned by the spring 45. In this case, the engagement of the geared portion 2a and the engaging portion 67b is insured (not only by the bias force of the spring 70 but also) by the engagement of the engaging portions 71b and 67c. Thereby an accidental stoppage of the rotation of the pinion 31 which would otherwise occur when the stopper 60 takes action before the termination of the winding operation is reliably avoided.

The detection of when the winding operation is terminated is made by the contact of the cam portion 41 with the charge completion detecting switch 42. At this time, the second cam portion 43 pushes the latch lever 71 at its tail 71c, thereby the latch lever 71 is turned in the counterclockwise direction to disengage its pawl 71b from the pawl 67c. Then the lever 67 is turned in the clockwise direction by the tensioned force of the spring 69. Though the spring 69 is made stronger than the spring 61, this balance only is hardly sufficient to hold the stop lever 60. At the same time, therefore, the atrractive force of the magnet 63 which appears when the coil is not energized is made to act on effectively, so that counterclockwise movement of the stop lever 60 is insured. By this, only when the winding operation is completed, the stop lever 60 is allowed to turn with the result that the stoppage of rotation of the pinion 31 is fixed, while the geared portion 2a is allowed to rotate.

Thus, the next sequence of operations is assured reliably. Now the position of FIG. 2(A) is regained.

Figure 3:
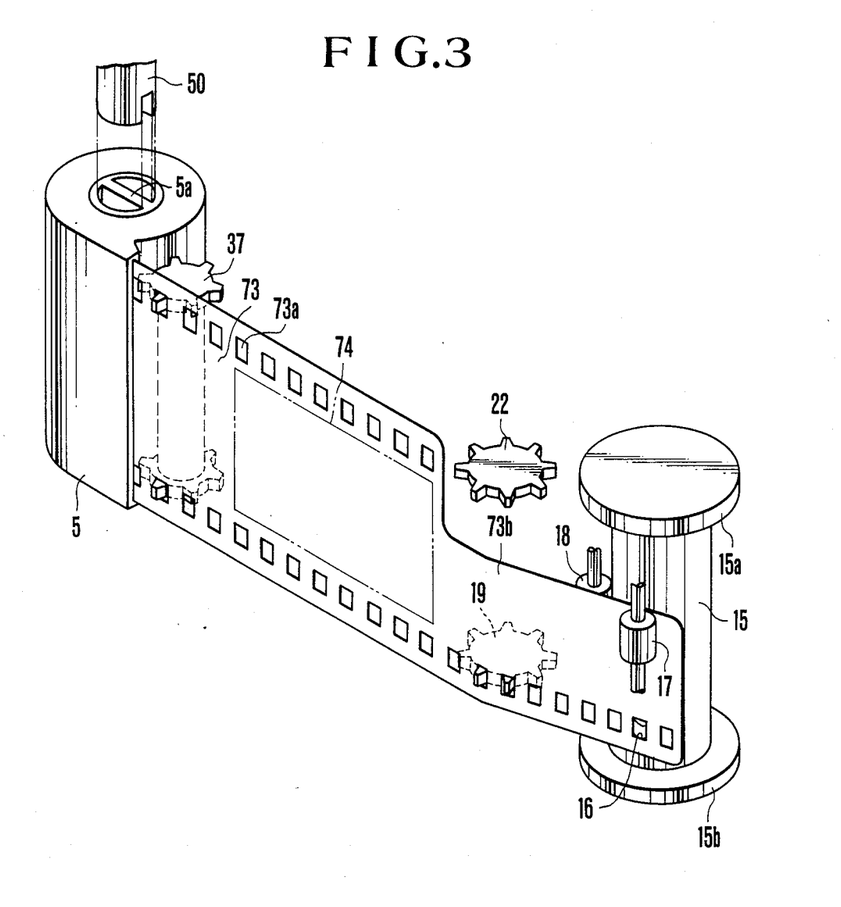
FIG. 3 is a perspective view illustrating a relationship between the film and the parts related to film transportation.

FIG. 3 in perspective view illustrates the relationship between the film and those of the members of the mechanisms of FIG. 2(A) which participate directly in transporting the film. 73 denotes the film, and 74 is an exposure aperture. In the following, by reference to FIG. 3, the features of the film are described. The most important feature of the present embodiment resides in the arrangement of the sprocket 37 and the role it plays. That is, the sprocket 37 is arranged adjacent to the film pullout mouth of the cartridge 5. Therefore, an advantage that despite the position of the film pullout mouth varies from cartridge type to cartridge type, the film can be smoothly pulled out likewise as in a case using a guide roller is produced. Next explained is about the role of the sprocket 37. At first explained is about the film auto-loading. The basic method of film auto-loading is to drive the film by the spool 15 utilizing the prior known pawl 16. Needless to say the case where, as shown in FIG. 3, the film leader 73b is manually put on the take-up spool 15 under a pressor roller 17, for a case where the film leader 73b is not yet accepted by the spool 15 and the pressor roller 17, automatic loading can be performed as the sprocket 37 pushes the film leader 73b to the spool 15. Then when the pawl 16 engages in one of the perforations of the film leader 73b, the spool 15 starts to pull the film, and the sprocket 37 is rendered inoperative by the action of the one-way clutch, following up the film in engagement with the perforations 73a thereof. It should be pointed out that even in the early stage of automatic loading, the driving power of the sprocket 37 is applied to the perforations of both of the upper and lower edges of the film and therefore that the problem which would be otherwise resulted when the sprocket 37 is positioned adjacent the take-up spool 15 to engage the perforations of only the lower edge is eliminated. Also, as the diameter of convoluted film on the take-up spool 15 increases with increase in the load thereon, when the speed of rotation of the spool 15 slows down below a prescribed level, the sprocket 37 is rendered operative to propel the film from the back, thus insuring a smooth film advancement.

When in the rewinding mode, as has already been described, the fork 50 rotates under a weak friction in such a range that the film is moderately tightened on the cartridge spool 5a, the part of the necessary load which accounts for more than that is borne by the sprocket 37. This feature has been made by taking into account that in general the efficiency of transmission between the fork 50 and the cartridge spool 5a is very low even in the normal atmospheric condition, and has been formed with an aim that even when the atmospheric condition worsens, the lowering of the efficency resulting from the increase in the rewinding torque for the film 73 is limited to a minimum rate. It should be noted in this connection that so long as the frictional force on the fork 50 suffices for rewinding the film, the sprocket 37 is rendered to follow up the perforations 73a of the film by the action of the one-way clutch. It should be noted then, when in the winding mode, the fork 50 is freed, and when in the rewinding mode, the take-up spool 15 is freed.

Figure 4:
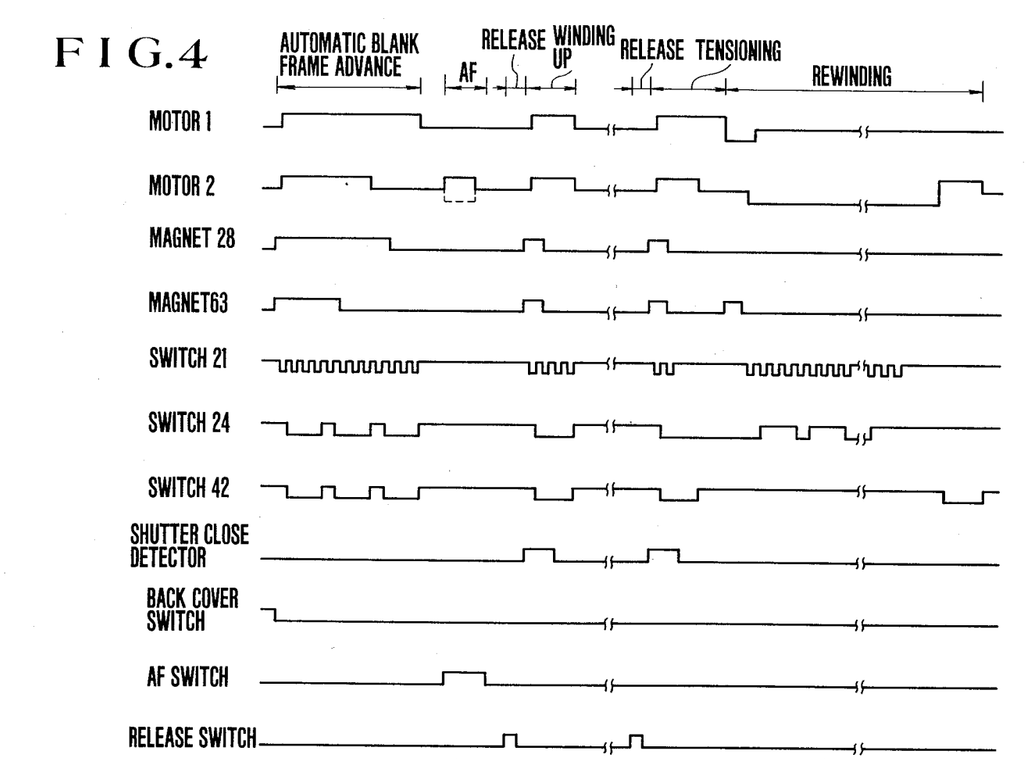
FIG. 4 is a timing chart of the electrical signals illustrated to explain the sequence of operations of the camera.
Figure 5:
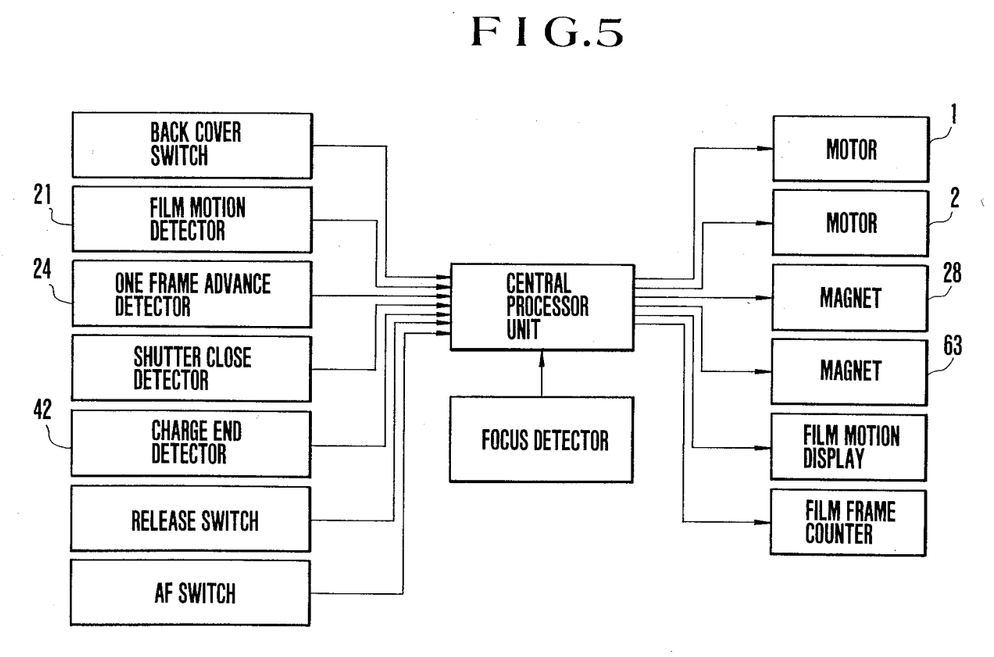
FIG. 5 is a block diagram illustrating the signal flow between the central processing unit and the input and output devices such as switches and motors.

Next explanation is given to the operation of the camera embodying the present invehtion. FIG. 4 is an electrical signal timing chart shown to explain the sequence of operations of the camera, and FIG. 5 in block diagram illustrates the flow of signals between a central processor unit (not shown) (hereinafter called "CPU") and the various switches and the motors.

First explanation is given to the automatic loading operation. The photographer will set the film leader as shown in FIG. 3, and then close the back cover of the camera, where a switch (not shown) is moved from its ON position to its OFF position. Responsive to this, CPU permits a supply of electrical power to the coils of the electromagnets 28 and 63. Since the magnet 28 is of the attraction type, the armature 27 is attracted, where the winding stop lever 25 is turned in the counterclockwise direction against the spring 26 to disengage its stopper portion 25b from the cam portion 23a. Since the magnet 63 is of the release type, the energization of the coil cancels the magnetic field of the permanent magnet, thereby the latch lever 65 is turned in the counterclockwise direction by the spring 66 to disengage its engaging portion 65b from the engaging portion 68b. Then, the lever 67 turns in the counterclockwise direction. Thereby the stop lever 60 is turned in the clockwise direction by the spring 61. Thus, the pinion 31 is rendered allowable to rotate. In this state, supply of current to the motors 1 and 2 starts. For the purpose of clarity, the direction of current flowing to the motors 1 and 2 is defined as forward for film winding and as reverse for film rewinding. At this time, both of the motors 1 and 2 are supplied with forward current. By the mechanism described in connection with FIG. 3, the film is advanced in blank exposures. The number of blank frames advanced past the exposure aperture is detected by using the switch 21 and is displayed by a liquid crystal device (not shown). Also a film frame counter (not shown) cooperates with the film advance completion detecting switch 24 and its display is presented by the liquid crystal device. The automatic blank frame advance is stopped when the signal from the aforesaid film advance completion detecting switch 24 has reached a prescribed value. In this case the stoppage of rotation of the motor 1 may be synchronized with a prescribed phase of the signal of the film advance completion detecting switch 24. With respect to the motor 2, however, to prevent jamming of the film, it must be stopped at the same time as, or earlier than, the stoppage of the motor 1. For this purpose, it might be otherwise possible that the charge completion detecting switch 42 is arranged to be actuated earlier than the actuation of the film advance completion detecting switch 24 so as to put forward the stoppage of the rotation of the motor 2. Since, at the time of advancing the film in vain, however, the motor 2 is not loaded with the shutter charging, the speed of rotation of the motor 2 necessarily increases, and the slack loop of film becomes longer than when the exposed film is advanced. By the above-described arrangement, therefore, it is difficult to perfectly avoid formation of any slack loop of film. For this reason, in this embodiment, in order to assure a reliability of automatic loading, the current supply to the motor 2 is cut off in response to that phase of the signal of the charge completion detecting switch 42 which occurs after that phase of the signal of the film advance completion detecting switch 24 which represents the last but one of the prescribed number of blank frames to be advanced. The current supply to the coils of the electromagnets 28 and 63 is cut off in a predetermined time from those phases of the signal which are one cycle ahead of those phases which are to stop the respective motors 1 and 2. As a result, at the termination of the automatic loading operation, the mechanism returns to the position of FIG. 2(A).

In this state, when an AF switch (not shown) is turned on by operating an actuator accessible from the outside of the camera, a focus detecting device (not shown) provided within the camera body produces an output signal. Responsive to this signal, CPU permits start of current supply to the motor 2. Motion of the motor 2 is transmitted from the geared portion 2a through the speed reduction gears 51 to 56 and the bevel gears 57 and 58 to the coupler 59 and therefrom further transmitted to the coupler (not shown) of the auto-focus lens until an in-focus condition is established. Then when a release switch (not shown) is turned on by operating an actuator therefor accessible from the outside of the camera, a camera release goes on in the prescribed sequence of operations well known to those skilled in the art. When the trailing curtain of the shutter runs down to terminate the exposure, a switch (not shown) is turned on. By this signal of the trailing curtain run completion detecting switch, a winding operation is initiated.

At first, in response to the signal of the trailing curtain run completion detecting switch, CPU permits supply of current to the magnets 28 and 63 for a predetermined time. Thereby the stopper portion 25b is disengaged from the cam 23a, and the pinion 31 is rendered rotatable. Then, the motors 1 and 2 are supplied with forward current to advance the film by one frame and to charge the shutter and the auto-focus lens. During this time, the signal from the film advance detecting switch 21 is used for renewing the display of the number of film frames exposed. Also when the shutter is charged, the trailing curtain run completion detecting switch returns to its off position. The motor 2 is stopped when the charge completion detecting switch 42 turns on. At the same time, by the action of the cam 43 the stop lever 60 is turned in the counterclockwise direction to render it possible to drive the auto-focus lens. Also the motor 1 is stopped when the film advance completion detecting switch 24 is turned on. The stoppage of the motor 1 occurs later than the stoppage of the motor 2. Such procedure repeats itself until the last available frame is exposed. Then, when the film is to be wound up, as the film is being tensioned, the camera is automatically switched from the winding mode to the rewinding mode. There are many methods for detecting when no more fresh area of film becomes available from the cartridge. Of these, in this embodiment, a timer is used as arranged to produce an output signal when the film advance completion detecting switch 24 does not give off the signal within a prescribed period from the initiation of the winding operation. This output signal is used for switching the camera from the winding to the rewinding mode. In the first step of this switching operation, a reverse current is supplied to the motor 1 and a current is supplied to the coil of the magnet 63 for a predetermined time. By the reverse rotation of the motor 1, the planetary gear 13 is taken out of meshing engagement with the geared portion of the spool flange 15a, where the take-up spool is rendered freely rotatable. Also the stopper 25b is retracted from the path of movement of the cam 23a. By the current supply to the coil of the magnet 63, the stop lever 60 is turned in the clockwise direction, where the pinion 31 is rendered rotatable. In the next or second step, a reverse current is supplied to the motor 2. Then the film starts to be rewound. During the rewinding, the signal of the film advance completion detecting switch 24 is changing with the change of the display of the counter. Also by the signal of the film leader detecting switch 21, another display of the movement of the film. When the film leader detecting switch 21 no longer produce the signal, as it is regarded as the termination of the rewinding of the film, the supply of the reverse current to the motor 2 is cut off. Then a forward current is supplied to the motor 2 until the charge completion detecting signal 42 turns on. Thus, the sequence of operations finishes. The reason why the motor 2 is finally supplied with the forward current for a short period is that the mechanisms are set in a standby state so that the AF lens is always ready to be driven.

Figure 6:
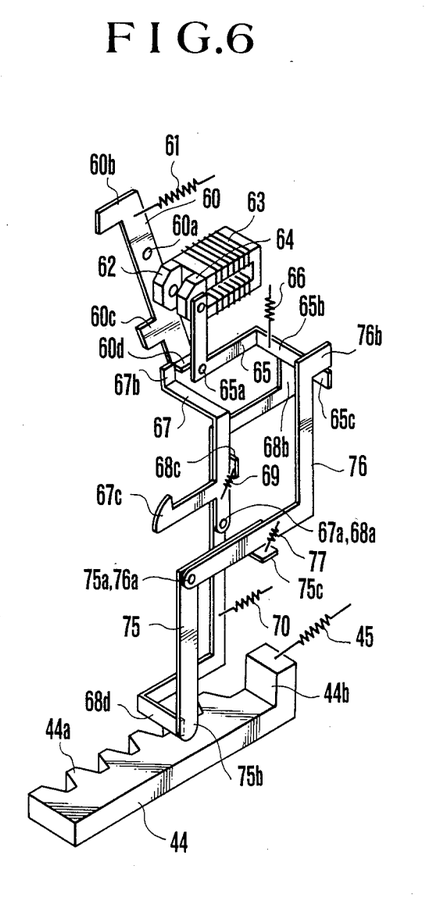
FIG. 6 is a perspective view of another embodiment of the shutter control mechanism according to the present invention.

FIG. 6 in perspective view illustrates another embodiment of the charge control mechanism formed by adding two levers 75 and 76 and a spring 77 to the charge mechanism for the armature 64 as the armature 64 is attracted or repelled by the magnet 63 shown in FIG. 2(A). In FIG. 2, when current is supplied to the coil of the magnet 63, the armature 64 is repelled by the spring 66. When the current supply is stopped, the armature 64 is attracted by the magnetic force of the permanent magnet against the spring 66. If the travel of the armature 64 is increased, as the air gap increases, the only magnetic force becomes difficult to attract. Such a problem can be solved by using the additional members described above.

The operation of the mechanism of FIG. 6 is described below. The mechanism of FIG. 6 is in the winding completed position. On this state, after the AF has finished, when a camera release is actuated, the coil of the magnet 63 is supplied with current for a predetermined time in response to the signal representing that the trailing curtain of the shutter has run down. Because the levers 75 and 76 are freely rotatable about pivot pins 75a and 76a, the latch lever 65 is turned in the counterclockwise direction by the spring 66 thereby the armature 64 is moved away. At this time, the engaging portion 65b is disengaged from the pawl portion 68b and the stop lever 60 turns in the clockwise direction. In this state, charging of the charge member 44 starts. In the last step of the charging operation, the charge portion 44b strikes the extension 68b and a cam portion 75b, where the levers 68 and 75 are turned in the clockwise direction. The lever 76 also is turned in the clockwise direction through the spring 77, while bringing the armature 64 into contact with the magnet 63 as the engaging portion 76b pushes the latch lever 65 at the portion 65b. The spring 77 is stronger than the spring 66. It is to be understood that before the pawl portion 68b and the engaging portion 65b come to engage with each other, the latch lever 65 is turned in the clockwise direction by the charge mechanism of this example which comprises the levers 76 and 75 and the spring 77, and therefore that the engagement of the pawl portion 68b and the engaging portion 65b can be established without fail.

Figure 7:
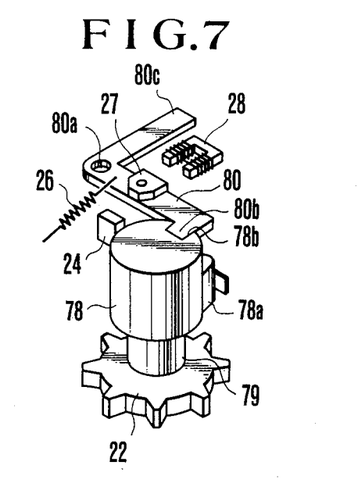
FIG. 7 is a perspective view of another embodiment of the winding stop lever of FIG. 2.

FIG. 7 in perspective view illustrates another embodiment of the winding stop lever 75 of FIG. 2(A). This example is different from that of FIG. 2 in the form of the winding stop lever 80 and the film advance control member 78 and the addition of a one-way clutch 79. The one-way clutch 79 of such known construction as shown in FIG. 2(B) operates to allow for clockwise rotation of the film advance detecting member 22 relative to the film advance control member 78. The functions of the winding stop lever 80, release portion 80c and cam portion 78a are exactly the same as in FIG. 2. Therefore no more explanation is given here. In this embodiment, the winding stop mechanism is formed by a pawl portion 80b and a detent slot 78b so that the film advance control member can be arrested within a prescribed range of angular positions in either direction. In the embodiment of FIG. 2, to establish the rewinding mode, the motor 1 is supplied with the reverse current to release the film advance control member 23 from the locking connection with the winding stop lever 25 as the latter turns in the counterclockwise direction. In this embodiment, on the other hand, the film advance control member 78 is left unchanged from the prescribed position, but the one-way clutch 79 is rendered operative to allow for film rewinding. It is preferred that the one-way clutch is given some friction so that as the film advance detecting member 22 moves in the clockwise direction, and the film control member 78 is caused to follow it up, being capable of placing its detent slot 78b in registry with the pawl portion 80b before the termination of the rewinding operation. Then when the camera is switched from the rewinding to the winding mode, therefore, the film advance control member 78 always have a certain phase. This constitutes a very effective means for stabilizing the automatic blank frame transportation after the camera is re-loaded with the new cartridge.

Figure 8:
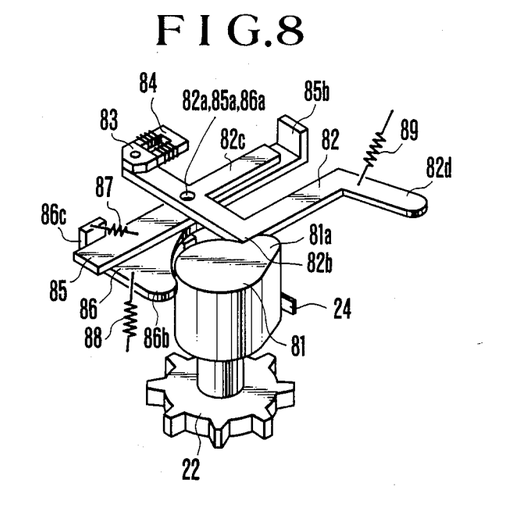
FIG. 8 is a perspective view of another embodiment of the control mechanism for the stop lever of FIG. 2.

FIG. 8 in perspective view illustrates another embodiment of the winding stop lever 25 in FIG. 2(A). In FIG. 2(A), in order to turn the winding stop lever 25 in the counterclockwise direction, use is made of the attraction type of the magnet 28 upon energization of its coil to attract the armature 27 against the spring 26. This system has a disadvantage that when the air gap between the magnet 28 and the armature 27 becomes large, it becomes difficult to assure the attraction. In this example, therefore, the charge mechanism for the armature 83 is constructed with a release type magnet 84 and is used for controlling the operation of the winding stop lever 82.

The operation of the mechanism of FIG. 8 is as follows: The position of FIG. 8 occurs when each cycle of winding operation is completed. After the exposure has been completed, when a signal representing that the trailing curtain of the shutter has run down is produced, the magnet 84 of the release type is supplied with current, thereby the magnetic force of the permanent magnet is cancelled. Then as the armature 83 is no longer attracted, the winding stop lever 82 turns about a pivot pin 82a in the counterclockwise direction by a spring 89. Therefore, the stopper 82b is moved away from the path of movement of the cam 81a, and the extension 82c releases a mirror (not shown) from the latching connection.

Then the motor 1 is supplied with forward current to initiate a film winding operation. As the film advances, the film advance detecting member 22 is rotated along with the film advance control member 81 in the counterclockwise direction. At a time during the winding operation, the cam 81a comes to contact with a cam 86b and then turns the lever 86 about a pivot pin 86a in the clockwise direction against the spring 88. Therefore, the lever 85 also turns about a pivot pin 85a in the clockwise direction through a spring 87. At this time a charge portion 85b turns the winding stop lever 82 in the clockwise direction against the spring 89, where the armature 83 is brought into contact on the attracting face of the release type magnet 84. Though, after that, the levers 85 and 86 return to the counterclockwise direction, the armature 83 is held in the attracted position by the force of the permanent magnet in the solenoid 84. When the film advance completion detecting switch 24 is actuated by the cam 81, the supply of current to the motor 1 is cut off, and the stopper 82b blocks the cam 81a. Thus, the position of FIG. 8 is regained.

When in the rewinding mode, the boss 14 strikes the cam 82d, where the winding stop lever 82 is turned in the counterclockwise direction. Then as the film is being rewound, the film advance detecting member 81 rotates in the clockwise direction through the film leader detecting member 22. At a time during each revolution of the member 81, the cam 81a strikes the cam 86b and then turns the lever 86 in the clockwise direction. It is to be noted here that after the lever 85 is stopped from further clockwise rotation by the winding stop lever 82 engaging with the charge portion 85b, the lever 86 is further turned while the spring 87 is being expanded to absorb the remaining stroke. It is also to be noted that the spring 87 has the function of absorbing the overcharging of the armature 83. Also the spring 88 is provided as a surplus means for preventing energy loss which would otherwise result when the winding stop lever 82 turns in the counterclockwise direction by the spring 89 to contact with the charge portion 85b.

As has been described above, according to the present invention, so long as the power necessary to rewind the film is so light that the friction torque the rewinding member has is sufficient for rewinding the film, the one-way clutch will not be transmitting the driving torque to the sprocket therethrough with an advantage that an otherwise necessary energy expenditure can be avoided. On the other hand, when, for example, the diameter of the convoluted film on the spool in the cartridge increases, the required magnitude of power for rewinding the film becomes so large that the friction torque of the rewind member no longer suffices, and the sprocket is rendered operative by the one-way clutch to apply its driving power directly to the film. Thus there is no possibility of occurrence of an accidental stoppage of the film during the rewinding operation. Therefore, the energy efficiency is improved and the rewinding operation is stabilized against variation of the load on the spool in the cartridge.

Another advantage of the embodiment of the present invention arises from the arrangement of the film winding motor adjacent the take-up spool, and of the rewinding motor in a space between the cartridge chamber and the mirror box at a corner near to the lens mount and the orientation that the axis of rotation of the rewinding motor is almost parallel to the axis of rotation of the spool in the cartridge, and is that it is made possible to transmit the driving torque to either of the take-up and supply spools at a good efficiency, and that as such motor arrangement permits use of that space in the camera which often becomes a dead space, a minimization of the size of the camera can be achieved. Also, when the rewinding motor is to change its direction of rotation, it can selectively perform driving of the film rewind member and charging of the shutter and the auto-focus lens, thereby it being made possible to realize an advance in the automation of the camera with the construction of simple form.

Another advantage of the embodiment of the invention arises from the fact that when to advance the film, the sprocket arranged between the film pullout mouth of the cartridge and the exposure aperture framework is drivenly connected to the motor which is near the cartridge chamber, and the take-up spool is drivenly connected to the motor adjacent thereto, and an automatic loading can be realized without involving any increase in the size of the camera and without causing damage of the perforations of the film leader.

Another advantage of the embodiment of the invention arises from the fact that the driving torque of a single motor with a rotary shaft and an outer tubular casing which are rotatable relative to each other can be transmitted selectively to one of the internal mechanisms of the camera, (for example, the rewinding one) and the operating mechanism for the auto-focus lens through respective intermediaries of simple construction and therefore there is no need to use a separate motor exclusively for driving the auto-focus lens, and is that a reduction of the production cost and a minimization of the size of the camera are facilitated.

Another advantage of the embodiment of the present invention arises from the fact that prior to energizing the film rewinding motor, the film winding motor is caused to rotate in the reversed direction to that when in the winding mode so that the planetary gear revolves to take the winding power transmission out of connection with the film drive gears and the winding stop lever can be mechanically released without fail and substantial electrical energy can be saved and the reliability of the control of the switching operation from the winding to the rewinding mode can be greatly improved.

Another advantage of the embodiment of the invention arises from the fact that two detecting members are used to rotate in engagement with the perforations of the film at the upper and lower edges thereof respectively and are arranged near the take-up spool to be rotatable independently of each other so that the former detecting member detects when the film is advanced through the length of exactly one frame, and the latter is made to detect a shorter length of film advance than that of one frame. Thus, automatic loading operation can be simply examined, and the length of the film leader can be simply evaluated, and therefore the control of the blank frame advancement according to the length of the film leader and the control of the length of the exposed portion of the film leader out of the cartridge when in the rewinding mode can be effected with ease.

What is claimed is:

1. A motor built-in camera adapted to receive therein a cartridge having film and a film take-up spool comprising:
   (a) an electric motor;
   (b) a first rewinding transmission system receptive to rotation of said motor as a drive source upon engagement with said film take-up spool of said cartridge to rewind the film;
   (c) a coupling portion provided in said first rewinding transmission system for transmitting rotation by frictional force;
   (d) a second rewinding transmission system receptive of rotation of said motor as a drive source upon engagement with the perforations of film to advance the film in the rewinding direction; and
   (e) a one-way clutch mechanism formed in said second rewinding transmission system, said one-way clutch mechanism being engageable according to the direction of rotation during rewinding in such a manner that it is engaged at the time point at which the film rewinding speed by said first rewinding transmission is reduced to a certain determined value.

2. A motor built-in camera according to claim 1, constructed in the form of a single lens reflex camera.

3. A motor built-in camera according to claim 1, including a cartridge chamber wherein said motor is arranged adjacent to said cartridge chamber.

4. A motor built-in camera according to claim 2, including a cartridge chamber, a mirror box and a lens mount, wherein said motor is arranged in a space between said cartridge chamber and said mirror box at a position near said lens mount.

5. A motor built-in camera according to claim 1, wherein said motor is arranged in parallel with the film take-up spool of the cartridge.

6. A motor built-in camera according to claim 4, wherein said motor is arranged in parallel with the film take-up spool of the cartridge.

7. A motor built-in camera according to claim 1, wherein said first rewinding transmission system is constructed with a gear train mechanism.

8. A motor built-in camera according to claim 1, wherein said first rewinding transmission system has a fork capable of mating with the take-up spool of the cartridge and is engaged with said take-up spool by said fork.

9. A motor built-in camera according to claim 1, wherein said coupling portion is connected by frictional force of a slip spring.

10. A motor built-in camera according to claim 1, wherein said second rewinding transmission system is constructed with a gear train mechanism.

11. A motor built-in camera according to claim 1, wherein said second rewinding transmission system transports the film in the rewinding direction by a rotatable member engaging with the perforations of the film.

12. A motor built-in camera according to claim 11, wherein said rotatable member is arranged adjacent to the cartridge chamber.

13. A motor built-in camera according to claim 1, wherein the taking up speed of the film take-up spool of said first rewinding transmission system is made faster than the advancing speed of the film perforations of said second rewinding transmission system.

14. A motor built-in camera according to claim 1, further comprising:
   (a) a planetary clutch mechanism arranged between said motor and said first rewinding transmission system; and
   (b) control means for changing over the direction of rotation of said motor.

15. A motor built-in camera comprising:
   (a) at least one electric motor;
   (b) a first rewinding transmission system receptive of rotation of said motor as a drive source for driving a film to move in the rewinding direction;
   (c) a second rewinding transmission system receptive of rotation of said motor as a drive source for driving the film to move in the rewinding direction; and
   (d) clutch means responsive to a faster film rewinding speed than in a predetermined value in said first rewinding transmission system for cutting off transmission of said second rewinding transmission system, and responsive to a slower speed than the predetermined value for establishing transmission of said second rewinding transmission system.

16. A motor built-in camera including a take-up spool, a cartridge chamber and a camera charge mechanism comprising:
(a) an electric motor for film winding up arranged adjacent to said take-up spool;
(b) a winding transmission system receptive to rotation of said motor as a drive source for driving a film to move in the winding direction;
(c) a motor for film rewinding arranged adjacent to said cartridge chamber;
(d) a rewinding transmission system receptive to rotation of said motor for film rewinding as a drive source for driving the film to move in the rewinding direction;
(e) a charge transmission system receptive to rotation of said motor for film rewinding as a drive source for charging said camera charge mechanism;
(f) control means for controlling the changing over between the forward and reverse directions of rotation of said motor for film rewinding; and
(g) a planetary clutch mechanism for changing over transmission to either of said rewinding transmission system or said charge transmission system depending on the direction of rotation of said motor for film rewinding.

17. A motor built-in camera according to claim 16, constructed in the form of a single lens reflex camera.

18. A motor built-in camera according to claim 16, wherein said motor for film rewinding is arranged adjacent to said cartridge chamber.

19. A motor built-in camera according to claim 17, further including a mirror box and a lens mount, wherein said motor for film rewinding is arranged in a space between said cartridge chamber and said mirror box at a position near said lens mount.

20. A motor built-in camera according to claim 16, adapted to receive therein a cartridge with a film take-up shaft, wherein said motor for film rewinding is arranged in parallel with said film take-up shaft of said cartridge.

21. A motor built-in camera according to claim 16, wherein said rewinding transmission system and said charge transmission system are arranged adjacent to said cartridge chamber.

22. A motor built-in camera according to claim 16, wherein said charge transmission system drives motion of a shutter charge mechanism.

23. A motor built-in camera including a take-up spool and a cartridge chamber comprising:
(a) a first motor arranged adjacent to said take-up spool;
(b) a first winding transmission system receptive to rotation of said first motor as a drive source for driving a film to move in the winding direction;
(c) a second motor arranged adjacent to said cartridge chamber;
(d) a second winding transmission system receptive to rotation of said second motor as a drive source and arranged adjacent to said cartridge chamber to transport the film in the winding direction; and
(e) a one-way clutch mechanism formed in said second winding transmission system.

24. A motor built-in camera according to claim 23, constructed in the form of a single lens reflex camera.

25. A motor built-in camera according to claim 23, wherein said first motor is arranged within said take-up spool.

26. A motor built-up camera according to claim 23, wherein said second motor is arranged adjacent to said cartridge chamber.

27. A motor built-in camera according to claim 24, further including a mirror box and a lens mount, wherein said second motor is arranged in a space between said cartridge chamber and said mirror box at a position near said lens mount.

28. A motor built-in camera according to claim 23, adapted to receive therein a cartridge having a film take-up spool, wherein said second motor is arranged in parallel with said film take-up shaft of said cartridge.

29. A motor built-in camera according to claim 23, wherein said second winding transmission system transports the film in the winding direction by a rotatable member in meshing engagement with the perforations of the film.

30. A motor built-in camera according to claim 29, wherein said rotatable member is arranged adjacent to the cartridge chamber.

31. A motor built-in camera including a take-up spool and a cartridge chamber comprising:
(a) a first motor arranged adjacent to said take-up spool;
(b) a first winding transmission system receptive to rotation of said first motor as a drive source and arranged near said spool to drive a film to move in the winding direction;
(c) a second motor arranged adjacent to said cartridge chamber; and
(d) a second winding transmission system receptive to rotation of said second motor as a drive source and arranged near the cartridge chamber to drive the film to move in the winding direction.

32. A motor built-in camera including a take-up spool and a cartridge chamber comprising:
(a) a first motor arranged adjacent to said take-up spool;
(b) a first winding transmission system receptive to rotation of said first motor as a drive source and arranged adjacent to the take-up spool to drive a film to move in the winding direction;
(c) a second motor arranged adjacent to said cartridge chamber;
(d) a second winding transmission system receptive to rotation of said second motor as a drive source and arranged adjacent to the cartridge chamber to drive the film to move in the winding direction;
(e) a rewinding transmission system receptive to rotation of said second motor as a drive source and arranged adjacent to the cartridge chamber to move the film in the rewinding direction; and
(f) clutch means for selectively transmitting rotation of said second motor to one of said second winding transmission system and said rewinding transmission system.

33. A motor built-in camera according to claim 32 further comprising:
control means for controlling changing over between the forward and reverse directions of rotation of said motor.

34. A motor built-in camera according to claim 33, wherein said clutch means is constructed with a planetary clutch mechanism for changing over transmission between said second winding transmission system and said rewinding transmission system depending on the direction of rotation of said second motor.

35. A motor built-in camera comprising:

(a) a motor having a rotary shaft and an outer tubular casing which are rotatable relative to each othe by magnetic interaction;

(b) selective rotation stop means for selectively locking one of the rotary shaft and outer tubular casing of said motor to stop rotation of the locked one; and (c) a first camera operation drive transmission system connected to one of the rotary shaft and the outer tubular casing of said motor as a drive source and a second camera operation drive transmission system connected to the other.

36. A motor built-in camera according to claim 35, constructed in the form of a single lens reflex camera.

37. A motor built-in camera according to claim 35, wherein said motor is arranged adjacent to said cartridge chamber.

38. A motor built-in camera according to claim 36, further including a mirror box and a lens mount, wherein said motor is arranged in a space between said cartridge chamber and said mirror box at a position near said lens mount.

39. A motor built-in camera according to claim 35, adapted to receive therein a cartridge with a film take-up shaft, wherein said motor is arranged in parallel with said film take-up shaft of said cartridge.

40. A motor built-in camera according to claim 35, wherein the rotary shaft and outer tubular casing of said motor have respective transmission gears formed therein, and said first camera operation drive transmission system and said second camera operation drive transmission system each are constructed with a gear transmission mechanism.

41. A motor built-in camera according to claim 35, wherein said second camera operation drive transmission system is used for driving a shutter to be charged.

42. A motor built-in camera according to claim 35, wherein said second camera operation drive transmission system is used for driving film winding motion.

43. A motor built-in camera according to claim 35, wherein said second camera operation drive transmission system is used for driving film rewinding motion.

44. A motor built-in camera comprising:
(a) a motor having a rotary shaft and an outer tubular casing which are rotatable relative to each other by magnetic interaction;
(b) selective rotation stop means upon selective arresting of either one of the rotary shaft and the outer tubular casing of said motor to stop rotation of the arrested one; and
(c) a first camera operation drive transmission system connected to one of the rotary shaft and the outer tubular casing of said motor as a drive source a second camera operation drive transmission system connected through clutch means to the other, and a third camera operation drive transmission system.

45. A motor built-in camera according to claim 44, constructed in the form of a single lens reflex camera.

46. A motor built-in camera according to claim 44, having a cartridge chamber wherein said motor is arranged adjacent to said cartridge chamber.

47. A motor built-in camera according to claim 44, wherein the rotary shaft and the outer tubular casing of said motor have respective transmission gears formed therein and said first camera operation drive transmission system, said second camera operation drive transmission system and said third camera operation drive transmission system each are formed by a gear transmission mechanism.

48. A motor built-in camera according to claim 44, wherein said third camera operation drive transmission system is used for film rewinding drive.

49. A motor built-in camera comprising:
(a) a motor;
(b) a winding transmission system receptive of rotation of said motor as a drive source for driving a film to move in the winding direction;
(c) a planetary clutch arranged in said winding transmission system;
(d) a winding stop member causing a winding operation related moving body to be arrested each time a film is wound up one frame and movable between said arresting position and a non-arresting position; and
(e) control means for controlling the forward and reverse rotation of said motor, whereby said winding stop member is arranged on the path of movement of a planetary gear of said planetary clutch to be taken out of mesh with said winding up transmission system when said motor rotates in the reversed direction to the film winding up direction, so that said winding stop member is moved from said arresting position to said non-arresting position by the movement of said planetary gear when in said out-of-mesh position.

50. A motor built-in camera according to claim 49, constructed in the form of a single lens reflex camera.

51. A motor built-in camera according to claim 49, including a take-up spool wherein said winding transmission system is arranged adjacent to the take-up spool.

52. A motor built-in camera according to claim 49, further comprising:
(a) an armature carried on said winding stop member; and
(b) an electromagnet arranged in confronting relation to said armature upon energization before an initiation of a winding operation to move said winding stop member from said arresting position to said non-arresting position.

53. A motor built-in camera according to claim 49, further comprising:
(a) a geared member arranged to mesh with the planetary gear of said planetary clutch as it moves when in said out-of-mesh position.

54. A motor built-in camera according to claim 49, wherein said geared member is formed by an internal gear.

55. A motor built-in camera comprising:
(a) a motor;
(b) a feeding transmission system receptive of rotation of said motor as a drive source for feeding a film;
(c) a first detecting wheel having a toothed portion for engagement with the perforations of the upper edge of the fed film by said feeding transmission system;
(d) a second detecting wheel having a toothed portion for engagement with the perforations of the lower edge of the fed film by said feeding transmission system and arranged to rotate independently of said first detecting wheel;
(e) first switching means arranged to operate when said first detecting wheel rotates and to detect at least one frame the film is fed; and (f) second switching means arranged to operate when said second detecting wheel rotates and to detect less than at least one frame the film is fed.

56. A motor built-in camera according to claim 55, constructed in the form of a single lens reflex camera.

57. A motor built-in camera according to claim 55, wherein said first detecting wheel is made to rotate one revolution for one frame of the film fed, and has one cam projection formed therein to push a movable contact plate of said first switching means in the switching direction.

58. A motor built-in camera according to claim 55, wherein said second detecting wheel has a plurality of cam projections formed therein to push a movable contact plate of said second switching means in the switching direction.

59. A motor built-in camera according to claim 55, wherein said first detecting wheel and said second detecting wheel are arranged adjacent to the spool.

60. A motor built-in camera according to claim 59, wherein said first detecting wheel and said second detecting wheel are arranged on a common axial line.

61. A motor built-in camera, comprising:
(a) a first motor arranged adjacent to a take-up spool;
(b) a first winding transmission system receptive of rotation of said first motor as a drive source and arranged adjacent to the spool to drive a film to move in the winding direction;
(c) a second motor arranged adjacent to a cartridge chamber;
(d) a second winding transmission system receptive of rotation of said second motor as a drive source and arranged adjacent the cartridge chamber to drive the film to move in the winding direction;
(e) a first detecting wheel having a toothed portion for engagement with the perforations of the upper edge of the film when the film is fed to the take-up spool;
(f) a second detecting wheel having a toothed portion for engagement with the perforations of the lower edge of the film when the film is fed to the take-up spool, and arranged to rotate independently of said first detecting wheel;
(g) first switching means arranged to operate when said first detecting wheel rotates and to detect at least one frame the film is fed; and
(h) second switching means arranged to operate when said second detecting wheel rotates and to detect less than at least one frame the film is fed.

62. A motor built-in camera according to claim 61, constructed in the form of a single lens reflex camera.

63. A motor built-in camera according to claim 61, wherein said first detecting wheel is made to rotate one revolution for one frame of the film fed, and has one cam projection formed therein to push a movable contact plate of said first switching means in the switching direction.

64. A motor built-in camera according to claim 61, wherein said second detecting wheel has a plurality of cam projections formed therein to push a movable contact plate of said second switching means in the switching direction.

65. A motor built-in camera according to claim 61, wherein said first detecting wheel and said second detecting wheel are arranged adjacent to the spool.

66. A motor built-in camera according to claim 61, wherein said first detecting wheel and said second detecting wheel are arranged on a common axial line.

67. A motor built-in camera comprising:
(a) a first motor;
(b) a winding transmission system receptive to rotation of said first motor as a drive source for driving a film to move in the winding direction;
(c) a second motor;
(d) a rewinding transmission system receptive to rotation of said second motor for driving the film to move in the rewinding direction;
(e) a first detecting wheel having a toothed portion for engagement with the perforations of the upper edge of the film fed by either said winding transmission system or said rewinding transmission system;
(f) a second detecting wheel having a toothed portion for engagement with the perforations of the lower edge of the film fed by either said winding transmission system or said rewinding transmission system and arranged to rotate independently of said first detecting wheel;
(g) first switching means arranged to operate when said first detecting wheel rotates and to detect at least one frame the film is fed; and
(h) second switching means arranged to operate when said second detecting wheel rotates and to detect less than at least one frame the film is fed.

68. A motor built-in camera according to claim 67, constructed in the form of a single lens reflex camera.

69. A motor built-in camera according to claim 67, wherein said first detecting wheel is made to rotate one revolution for one frame of the film fed, and has one cam projection formed therein to push a movable contact plate of said first switching means in the switching direction.

70. A motor built-in camera according to claim 67, wherein said second detecting wheel has a plurality of cam projections formed therein to push a movable contact plate of said second switching means in the switching direction.

71. A motor built-in camera according to claim 67, wherein said first detecting wheel and said second detecting wheel are arranged adjacent to the spool.

72. A motor built-in camera according to claim 67, wherein said first detecting wheel and said second detecting wheel are arranged on a common axial line.

73. A motor built-in camera comprising:
(a) a motor;
(b) a feeding transmission system receptive of rotation of said motor as a drive source for feeding a film;
(c) a first detecting wheel arranged to rotate in engagement with the upper edge of the film fed by said feeding rransmission system as said film is being fed;
(d) a second detecting wheel arranged to rotate in engagement with the lower edge of the film fed by said feeding transmission system as the film is being fed and to rotate independently of said first detecting wheel;
(e) first switching means arranged to operate when said first detecting wheel rotates and to detect at least one frame the film is fed; and
(f) second switching means arranged to operate when said second detecting wheel rotates and to detect less than at least one frame the film is fed.

74. A motor built-in camera comprising:
(a) a motor;

(b) a feeding transmission system receptive of rotation of said motor as a drive source for feeding a film;
(c) a first detecting means for detecting the film feeding state at the upper position of the film fed by said feeding transmission system; and
(d) a second detecting means for detecting the film feeding state at the lower position of the film fed by said feeding transmission system independently of said first detecting means.

75. A motor built-in camera according to claim 74, including a spool wherein said first detecting means is arranged adjacent to the spool.

76. A motor built-in camera comprising:
(a) an electric motor;
(b) a winding up transmission system receptive of rotation of said motor as a driving source for driving a film to move in the winding up direction;
(c) a planetary clutch arranged in said winding up transmission system;
(d) a winding stop member movable between said arresting position and a non-arresting position;
(e) control means for controlling the forward and reverse rotation of said motor; and
(f) changeover means operatively engageable with a planetary gear of said planetary clutch so as to change over said winding stop member out of said arresting position into said non-arresting position along with the movement of said planetary gear.

* * * * *